United States Patent [19]

Cosser

[11] Patent Number: 4,646,569
[45] Date of Patent: Mar. 3, 1987

[54] FLUID LEVEL MEASUREMENT SYSTEM

[75] Inventor: Harry F. Cosser, Fleet, England

[73] Assignee: Schlumberger Electronics (U.K.) Limited, Farnborough, England

[21] Appl. No.: 730,538

[22] Filed: May 6, 1985

[30] Foreign Application Priority Data

May 16, 1984 [GB] United Kingdom ............. 8412461

[51] Int. Cl.$^4$ ............................................. G01F 23/22
[52] U.S. Cl. ................................... 73/304 R; 307/118
[58] Field of Search ...................................... 73/304 R

[56] References Cited

U.S. PATENT DOCUMENTS

| | | | |
|---|---|---|---|
| 2,470,510 | 5/1949 | Matson et al. | 73/304 R |
| 2,735,301 | 2/1956 | Schwob | 73/304 R |
| 3,119,266 | 1/1964 | Atkinson | 73/304 R |
| 3,339,411 | 9/1967 | Riffie | 73/304 R |
| 3,777,177 | 12/1973 | Norkum et al. | 73/304 R X |
| 3,975,582 | 8/1976 | Ford | 73/304 R X |
| 4,027,172 | 5/1977 | Hamelink | 73/304 R X |
| 4,284,951 | 8/1981 | Dahl et al. | 73/304 R X |
| 4,465,088 | 8/1984 | Vosper | 73/304 R X |

FOREIGN PATENT DOCUMENTS

| | | |
|---|---|---|
| 551517 | 2/1943 | United Kingdom . |
| 695074 | 8/1953 | United Kingdom . |
| 700466 | 12/1953 | United Kingdom . |
| 980064 | 1/1965 | United Kingdom . |
| 1150395 | 4/1969 | United Kingdom . |
| 1288177 | 9/1972 | United Kingdom . |
| 1290615 | 9/1972 | United Kingdom . |
| 1523338 | 8/1978 | United Kingdom . |
| 2040468 | 8/1980 | United Kingdom . |
| 2043259 | 10/1980 | United Kingdom . |
| 1600329 | 10/1981 | United Kingdom . |
| 2077924 | 12/1981 | United Kingdom . |

Primary Examiner—Daniel M. Yasich
Attorney, Agent, or Firm—Dale Gaudier

[57] ABSTRACT

In a fluid level measurement system for the measurement of a level of fluid in a vessel the electrical impedance of a first conduction path between a central rod electrode and a surrounding cylindrical electrode and the electrical impedance of the second conduction path between the cylinder and the vessel are established. The first conduction path is restricted to be below the minimum fluid level by an insulating coating on the rod. The second conduction path varies with the fluid level. An output signal is extracted from the electrodes potentiometrically which is indicative of the fluid level. The signal may be linearized by application to a circuit having a matched non-linear transfer function. With this arrangement, a continuous output signal indicative of the fluid level is produced which is not subject to errors due to changes in fluid resistivity.

13 Claims, 11 Drawing Figures

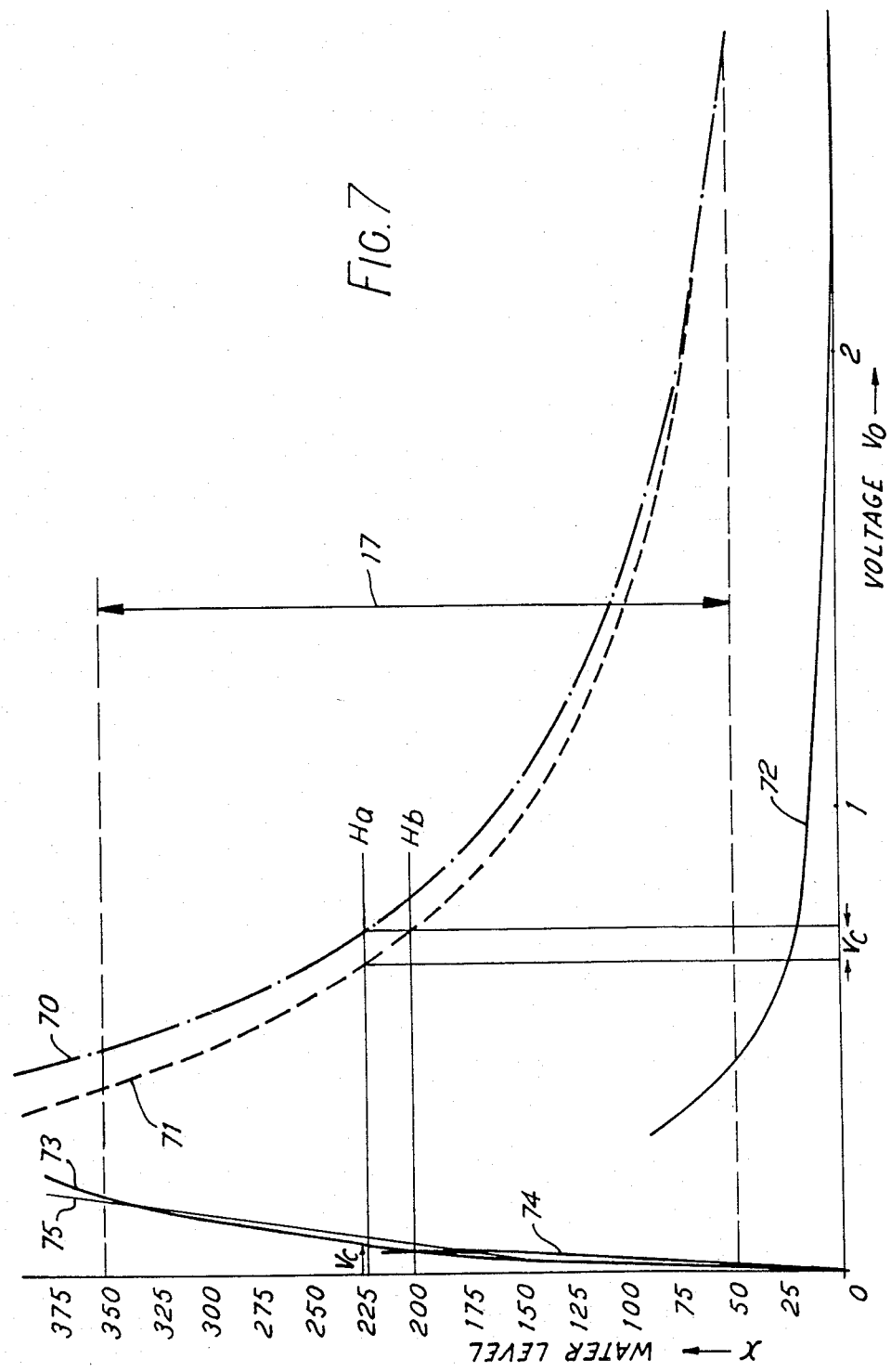

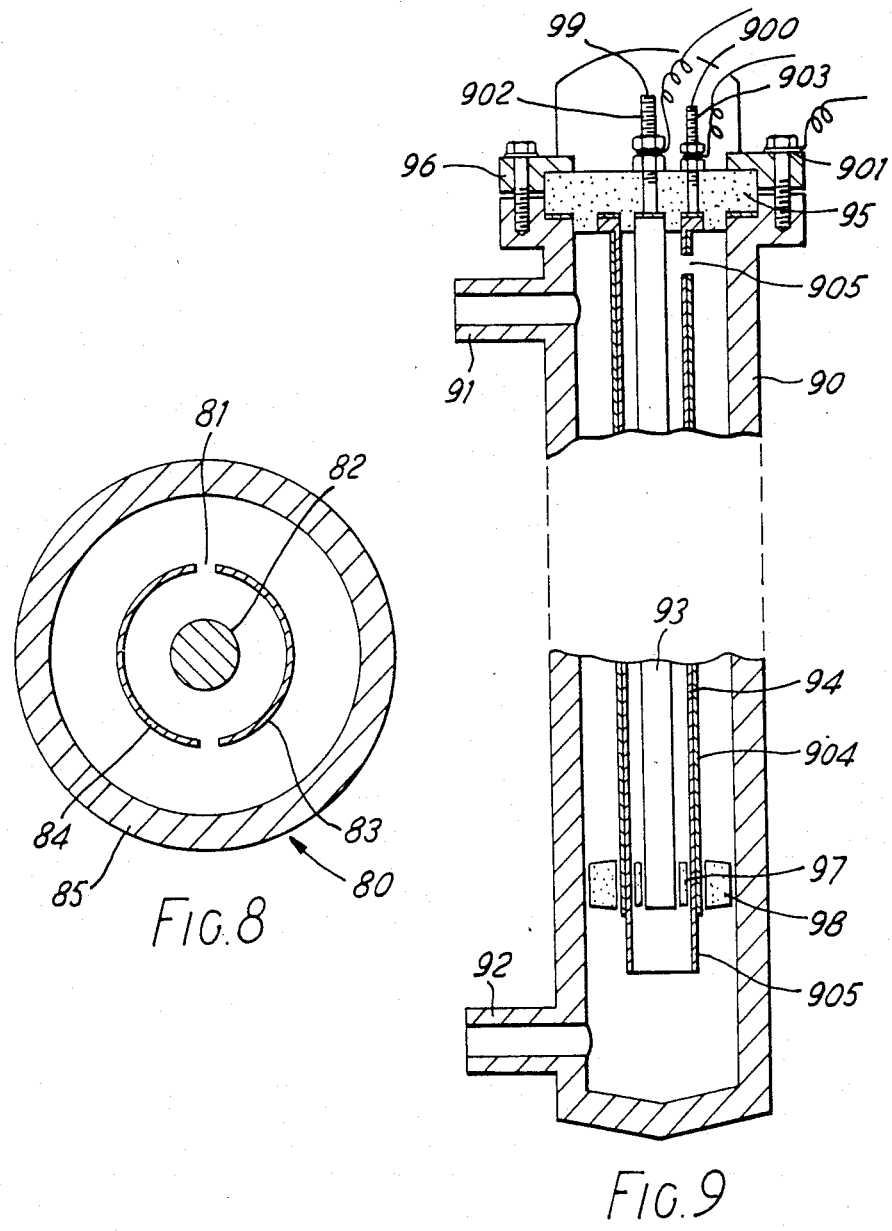

FLUID LEVEL MEASUREMENT SYSTEM

This invention relates to the measurement of fluid level, and in particular to the measurement of fluid level within a closed vessel, for example, a boiler subject to internal pressure variation.

In fluid level detection the different resistivity of fluids may be exploited to detect fluid level, for example the change in conductive medium from water to steam between an electrode pair as water level falls in a boiler. Level may be indicated by providing a plurality of detectors over a range of interest and displaying the results. Such a system has the advantage of being self validating, it being evidence of an error if for example water is detected above steam in a boiler.

In a number of applications, for example proportional control of a fluid input valve, a continuous output of fluid level is desirable. Such an output can be provided with level detectors but with the disadvantages that signals from discrete sensors must be combined and that in a high resolution system many sensors will be required, which in addition to expense has the disadvantage of increasing the risk of a seal failure.

In high pressure boiler systems it is customary for sensors to be provided in a separate side tank tapped into the boiler pressure vessel over the level range of interest, on the assumption that there will be a common level.

According to the present invention a fluid level measurement system includes means for determining electrical impedance of a first conduction path through the fluid established between a first pair of electrodes, means for determining electrical impedance of a second conduction path through the fluid established between a second pair of electrodes, which path varies with fluid level over a range of interest, an electrode of the first pair having a surface insulated over the range of interest such that the first conduction path is established through fluid below the range of interest and means for providing an electrical output signal, which signal includes a term proportional to path impedance ratio.

Advantageously, one electrode is electrically common to each electrode pair and the output signal extracted potentiometrically. The common electrode may have electrically separate segments to provide validation. Where fluid is contained in a conductive vessel, the vessel may act as an electrode.

In a preferred form of the present invention a first electrode pair is formed by a conductive rod having an insulating coating along its length, save for a tip section and a surrounding conductive cylinder so that a first conduction path is established through fluid surrounding the rod tip and a second electrode pair is formed between the cylinder and container.

Advantageously, a coefficient of proportion applied to the impedance ratio term is varied over the range to provide an output signal which varies substantially linearly with level. This may be done by varying the available area of one or more electrodes over the range, for example by varying the amount of an insulating coating applied to the electrode, but preferably by applying a signal derived from the electrodes to a circuit having a non-linear transfer function over the range. The transfer function of such a circuit also advantageously includes terms providing compensation, for example for level errors due to density variation in a side arm vessel.

In order that features and advantages of the present invention may be appreciated, an embodiment will now be described by way of example only and with reference to the accompanying diagrammatic drawings, of which:

FIG. 7 represents further output characteristics,

FIG. 8 is a plan view (for example from II of FIG. 1) of apparatus having a segmented electrode, FIG. 9 represents an alternative side-arm measurement apparatus.

Figure 1:
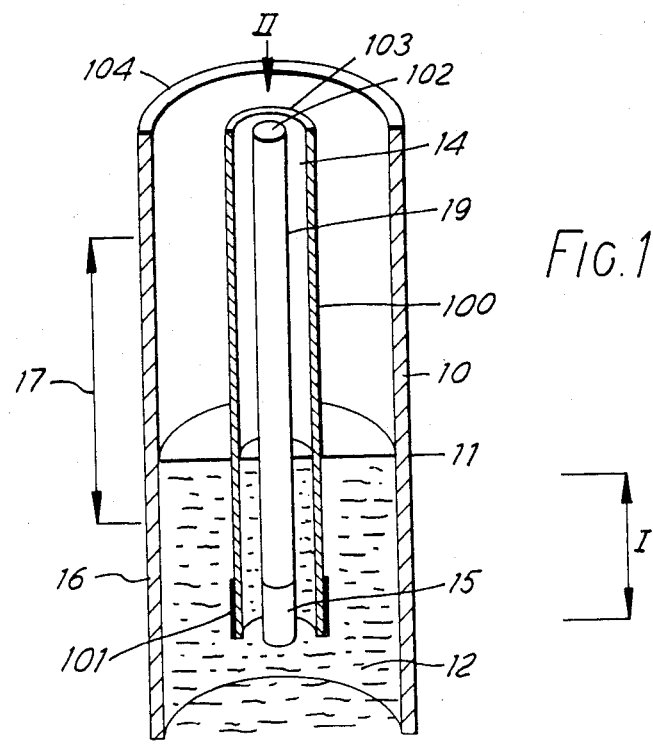
FIG. 1 represents fluid level measurement apparatus.

In a vessel 10 (FIG. 1), the level 11 of a fluid 12 is to be measured. Electrode structure 14 is introduced such that its tip 15 is below a minimum level 16 of the fluid 12 and such that the structure 14 extends over a measurement range of interest between two limiting points 17 as shown in the drawings. The electrode structure 14 comprises a central conductive rod 18 having an insulating coating 19 along its length other than at tip section 15 and a surrounding conductive cylinder 100 which has an insulating coating 101 at tip section 15. This coating, although not essential, prevents conduction and consequent lowering of $Z_x$ before $Z_1$ is established. Vessel 10 is itself conductive, and constitutes a further electrode. It will be appreciated that impedance measurements of various conduction paths may be made by connections (not shown) to surfaces 102, 103 and 104.

Figure 2:
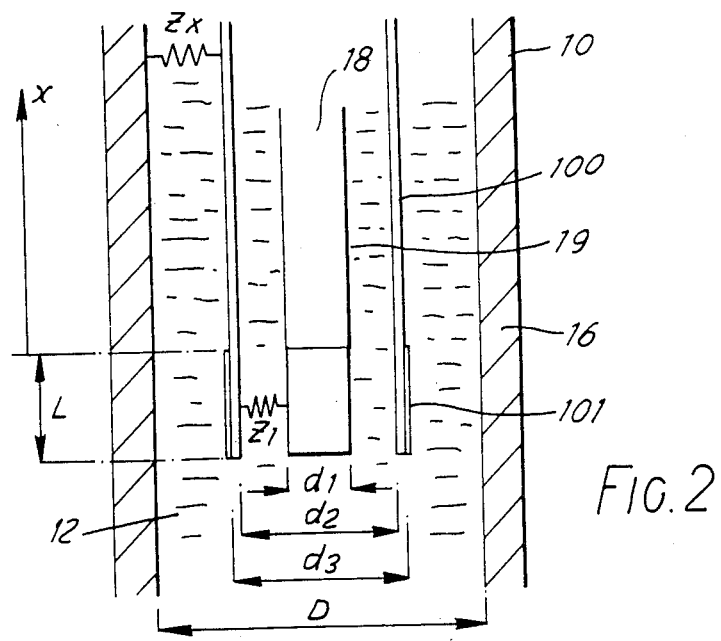
FIG. 2 represents a detailed view of the apparatus of FIG. 1 over the range I.

Electrical impedance between the rod 18 as a first electrode and the cylinder 100 as a second electrode will be that of a conduction path through the fluid 12 in the region between the electrodes (indicated diagrammatically as $Z_1$ (FIG. 2). The insulating coating 19 applied to the rod 18 substantially confines the conduction path to fluid between the electrodes at the tip section 15 and since the tip section is arranged to be below the minimum fluid 16, it is known that the impedance of this path will always be due to fluid.

Similarly electrical impedance ($Z_x$) between the cylinder 100 as a first electrode and the vessel 10 as a second electrode will be due to a conduction path through fluid in the region between the electrodes. Insulating coating 101 substantially confines conduction to the region away from tip section 15. It will be realised that the impedance of this second conduction path varies with the level of the fluid 12 in the vessel 10.

It can be shown that the impedance of the conduction paths is:

$$Z_1 = \frac{2.3 \log_{10}(d_2/d_1)}{2\pi h} \cdot \rho \text{ and,}$$

$$Z_x = \frac{2.3 \log_{10}(D/d_3)}{2\pi x} \cdot \rho$$

where:

$d_1$ = the diameter of rod 18 (10 mm)
$d_2$ = the internal diameter of cylinder 100 (21 mm)
$d_3$ = the external diameter of cylinder 100 (24 mm)

D = the internal diameter of the vessel 10 (52 mm)
h = the length of the tip section 15 (16 mm)
x = the fluid level, above minimum level 16
and $\rho$ is the resistivity of the fluid.
Typical practical values are shown in brackets.

It will be appreciated that by taking an impedance ratio, an expression for the fluid level x independent of $\rho$ may be derived. A convenient way of achieving this since $Z_x$ and $Z_1$ are electrically in series by virtue of the common cylinder electrode 100 is to apply a known voltage ($V_1$) to the series and extract an output signal ($V_0$) from the common electrode potentiometrically or the ratio of these measured impedances. For a potentiometer:

$$V_O = \frac{Z_x}{Z_1 + Z_x} \cdot V_1$$

$$= \frac{K_1}{K_1 + K_2 X} \cdot V_1$$

where:
$K_1 = \log_{10}(D/d_3)$ (0.336)
and
$K_2 = [\log_{10}(d_2/d_1)]/h$ (0.020 mm$^{-1}$)

Figure 3:
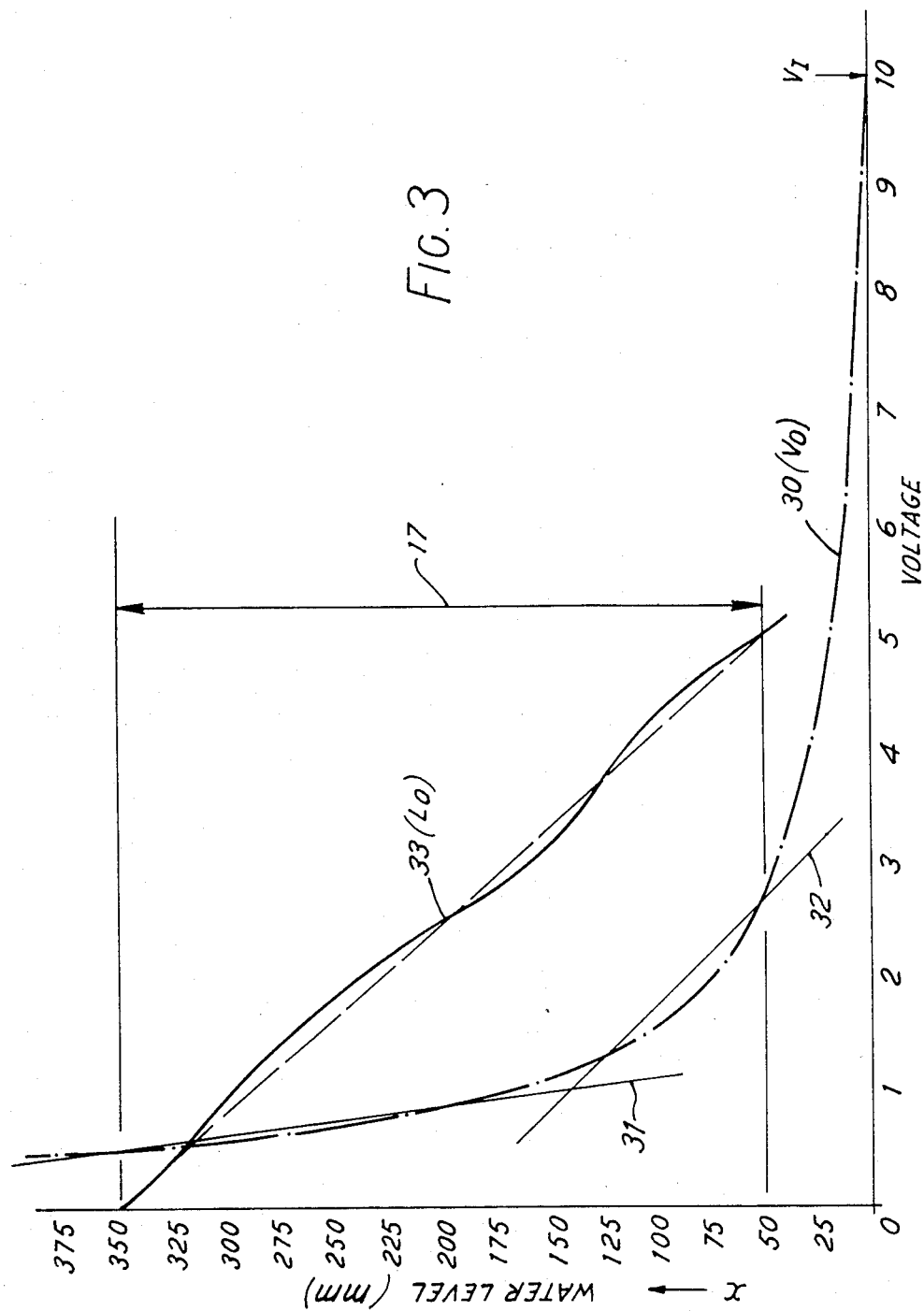
FIG. 3 represents typical output characteristics.

It will be appreciated that $V_0$ provides a signal representative of fluid level 12. The nature of the relationship between $V_o$ and x for typical values of the constant terms is shown by curve 30 (FIG. 3). By arranging the electrode structure to be longer than the level range of interest, the measurement range of interest 17 is restricted to a portion 31 of the curve 30, which is susceptible to simple straight line approximations 32, 33. The output signal $V_o$ may thus be applied to a circuit which enforces a varied constant of proportionally between its input and output to effectively provide an output signal which varies substantially linearly with fluid level. A circuit with a transfer function 40 (FIG. 4) defining the relationship between an input $V_{in}$ and an output $V_{out}$ provides a signal $L_o$ in response to $V_o$. For a measurement system as described thus far, the variation of output ($L_o$) with level (x) is shown by trace 33 (FIG. 3), and will be seen to be substantially linear over the measurement range of interest 17. The present embodiment of the invention will now be described in further detail.

Figure 4:
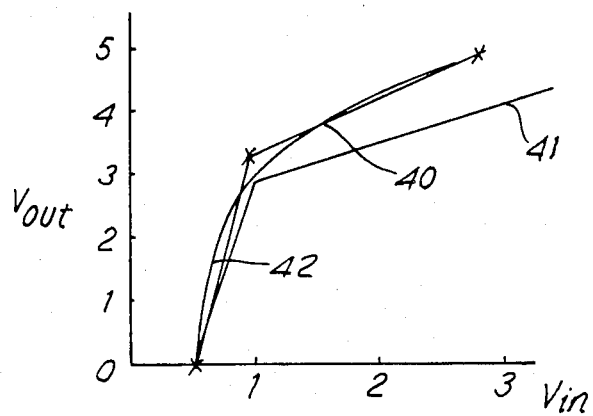
FIG. 4 represents a transfer function.

The impedances $Z_1$ and $Z_x$ are arranged potentiometrically, and energized by a signal generator 50 (FIG. 5) at a suitable voltage $V_I$. $V_I$ is an ac signal to avoid electrode potentials and galvanic action at the electrode structure and vessel. The resulting signal ($V_o$) is full wave rectified by rectifier 51 and the negative d.c. level taken to an inverting amplifier 52. Gain defining resistors 53, 54 and 55 are biassed so that the amplifier gain is determined by resistors 53 and 54 in the input range 0 to 1 volt and by resistors 53 and 54, 55 in the range 1 to 3 volts. Resistor values for 54, 55 are selected to include the conduction characteristics of the diodes so that a rounding of the straight line segments occurs, thus obtaining a more accurate fit, 42, to the required curve, 30. Subtraction of 0.5 V at the amplifier input brings the circuit transfer function into conformity with transfer function 40 (FIG. 4). The output voltage Lo varies in the range 0 to 5 V with fluid level and may be straight forwardly interfaced to display apparatus and to actuators, such as flow control valves.

A further emobodiment of the present invention suitable for boiler installation will now be described.

Figure 6:
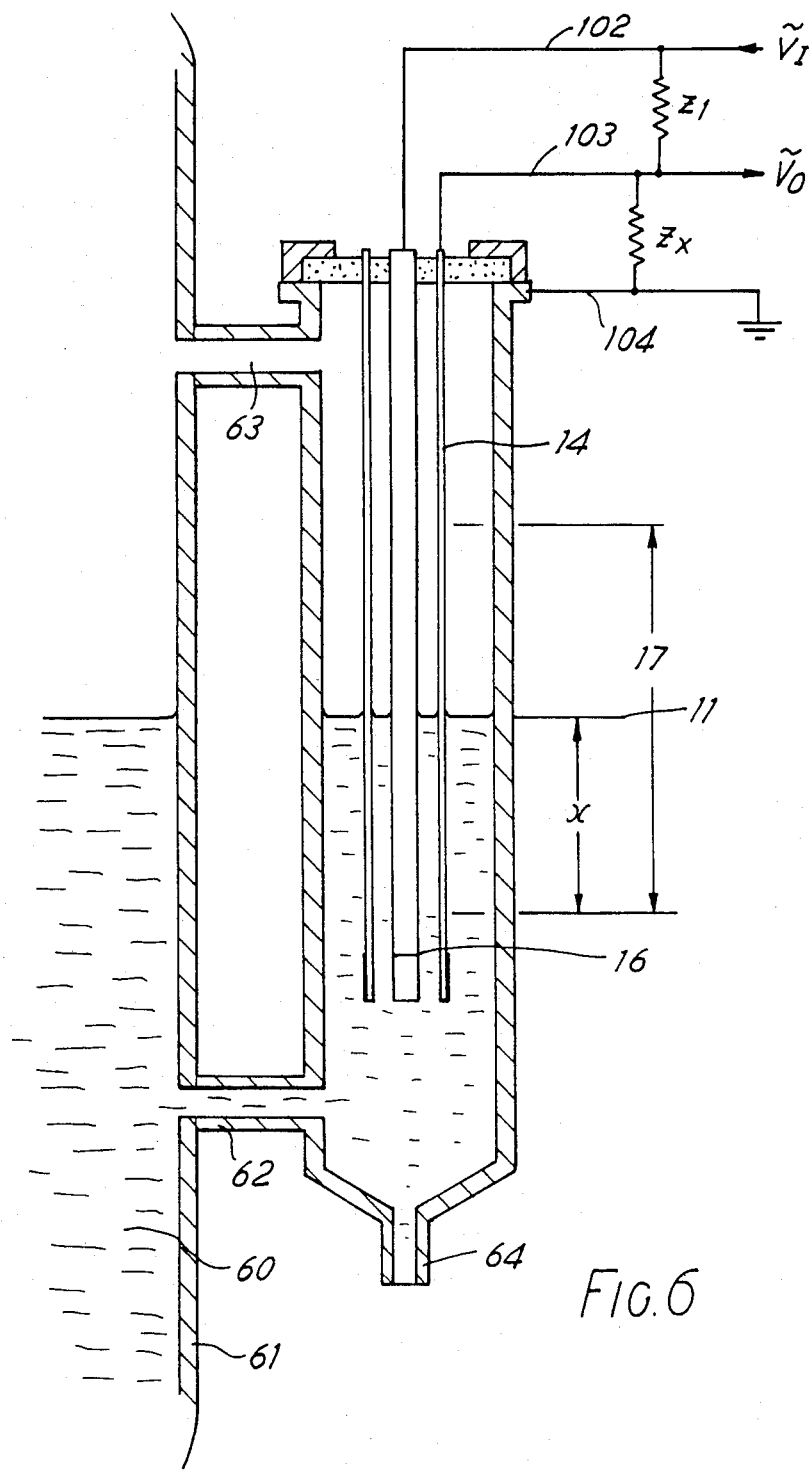
FIG. 6 represents side-arm measurement apparatus for a high pressure boiler.

In a fluid level measurement system for the measurement of the level 11 (FIG. 6) of water 60 in a boiler 61 over a range 17, a pressure vessel 10 is tapped into the boiler at first point 62 below the minimum water level 16 and at a second point 63 above the maximum water level (i.e. in the steam) such that water level x (11) is common. Electrode structure 14 is introduced into the vessel in accordance with the constraints discussed above and electrical connections 102, 103, 104 made as convenient. As previously discussed the voltage $V_o$ may be further processed to provide a measurement of the water level x. A particular advantage of the present invention is that a continuous linear output is achieved by introducing only a single probe into the pressure vessel, thus minimising the number of potentially troublesome seals.

For high pressure boilers a gauge of the side arm type as described above has a number of advantages. Nothing extraneous is introduced into the boiler chamber, if passageways 62 and 63 are valved the gauge may be sealed off and thereby drained (via drainway 64), serviced and calibrated independently of the boiler. Unfortunately, however some problems arise through the remote location of the sensor. The pressure vessel will be at a lower temperature than the boiler due to heat losses and therefore water temperature in the vessel will be below that in the boiler. Gauge water density will therefore be greater than boiler water density and the system will reach equilibrium with the gauge water level below the boiler water level. Such a density error is ameliorated to some extent by good heat conduction between boiler and vessel and along vessel walls which tends to return heat released by condensation or vessel surfaces above the water level to the water bulk. However, the error can remain significant, particularly for high pressure (in excess of 100 bar) systems.

Figure 5:
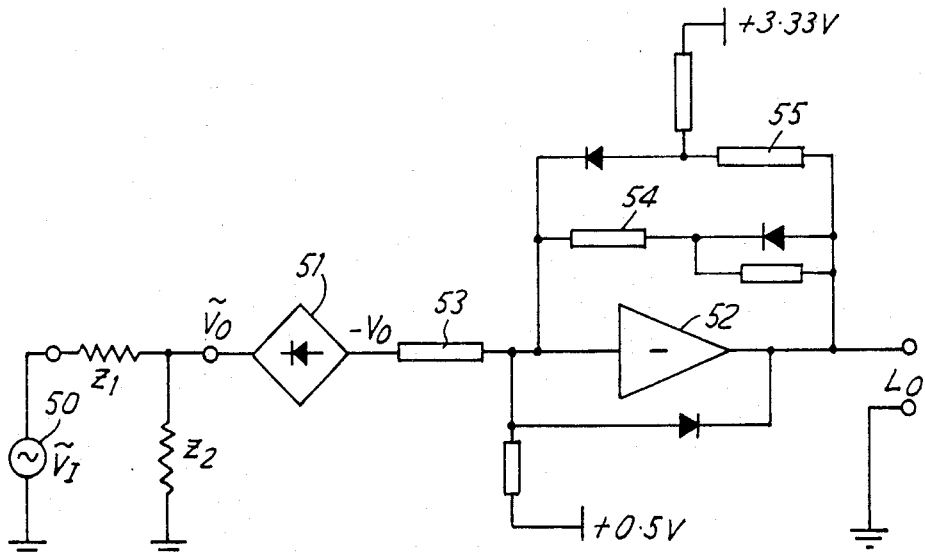
FIG. 5 represents a circuit having the transfer function of FIG. 4.

For a side arm gauge, the indicated level 70 (FIG. 7) departs from the actual level in the boiler 71 through density errors as described above. Such errors may be quantified for any particular installation and the amount of correction required established in terms of a required correction 72. Trace 72 may be built up by calculating $H_a - H_b$ over the level range of interest 17, and from this a correction voltage 73 ($V_c$) appropriate to each level derived. The correction required may be approximated by straight lines 74, 75 and superimposed on transfer function 40 (FIG. 4) to give a corrected output 41. It will be appreciated that this may be straightforwardly acheived by altering resistor ratios 53.54 and 53.55 (FIG. 5).

In boiler systems level measurement and control system failure has potentially disatrous consequences. There is hence a requirement for validation of results. This may be provided by duplication, but in the present invention duplication of the whole system is unnecessary. Instead, part of the electrode structure may be segmented to provide as many effectively independent measurements as desired.

For example, in electrode structure 80 (FIG. 8) a cylinder 81, surrounding a rod electrode 82, is segmented into two electrically separate electrodes 83 and 84. A further electrode is provided by vessel 85. Hence, two measurement systems are provided using electrode structure 82, 83 85 and 82, 84, 85 respectively.

In an alternative form of the present invention the rod electrode and the cylinder electrode may be surrounded by a further cylinder which constitutes, the third electrode. Such an arrangement is clearly advantageous where the fluid container cannot conveniently be used as an electrode, for example where it is non-metallic or irregular in shape, or where gauging is required in an uncontained fluid.

A further embodiment of the present invention will now be described.

A side arm vessel 90 (FIG. 9) is connectable to a boiler for the measurement of water level therein via ports 91 and 92 as previously described. A first electrode 93 formed as a rod and a second electrode 94 formed as a cylinder are mounted in a ceramic insulating moulding 95 and clamped via flange 96 to extend into the vessel 90. Insulating spacing rings 97, 98 are mounted between the lower ends of the electrodes and the vessel at a level substantially that of the lowest level to be measured. Electrical terminations 99, 900, 901 are provided on external extensions 902, 903 of the rod and cylinder electrodes respectively and to the vessel 90.

It will be appreciated that by virtue of this arrangement a conduction path representative of fluid level may be established between the rod electrode 93 and the inner surface of cylinder electrode 94. The outer surface of the cylinder electrode carries an insulating layer 904 of for example ceramic or PTFE. A conduction path invariant with fluid level may be established between the vessel 90 and an uninsulated portion 905 of cylinder electrode 94 extending below the minimum fluid level. It will be apparent that cylinder 84 constitutes a common electrode between the two conduction paths, and that a signal representative of fluid level in the vessel 90 may therefore be extended potentiometrically as previously described such as by deriving the ratio of the measured impedances over these two conduction paths, the path of known impedance being between the vessel 90 and the cylinder electrode 94, and the path varying with fluid level being between the cylinder 94 and the rod electrode 93.

Considering water level in an otherwise steam filled vessel, a resistive potentiometer will be formed, having its junction at cylinder electrode 94. For a voltage applied between terminals 99, and 901 on the rod and vessel respectively a voltage representative of fluid level may be derived at this junction. If terminal 901 is considered grounded, then the output voltage is developed across the invariant resistance of the conduction path between cylinder extension 905 and the vessel 90. Thus the output voltage increases as fluid level increases. This arrangement of the present invention is particularly advantageous for control applications where the failure mode of equipment is important. It will be appreciated that open circuit failure of any connection will force a zero output, which is the low level signal allowing for example a boiler to be shut down in the event of such failure. The present embodiment is also well suited to applications where fluid level is subject to transients.

The variable conduction path is established by the level of fluid between rod 93 and cylinder 94 which is buffered for example against splashes and turbulence. The transient performance of the equipment may be influenced by the size of a vent hole 904 in cylinder 94.

Where an indication of fluid level rather than a continuous output is required an alternative rod electrode 100 (FIG. 10) may be employed. This electrode carries insulated bands, such as bands 101 and 102 formed of ceramic or PTFE coating. Such an electrode may be used in an arrangement otherwise identical to that described with reference to FIG. 9. It will be appreciated that the modified electrode 100 imparts a non-linear characteristic to the output, there being a comparatively large change in output when fluid level rises to meet an uninsulated portion, such as portion 103, and a comparatively small change as level rises over an insulated portion.

Figure 10:
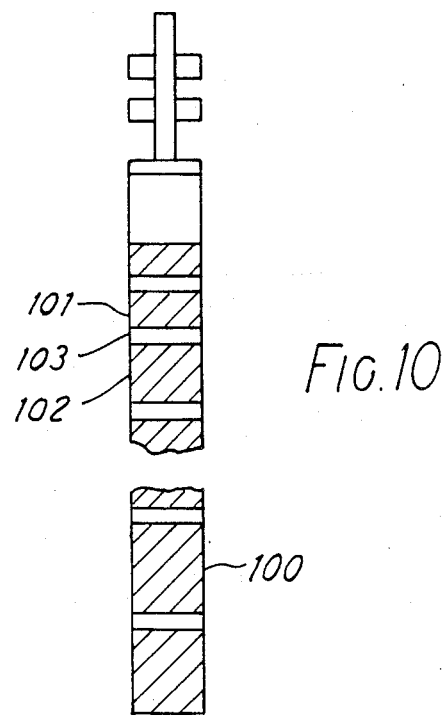
FIG. 10 represents a segmented electrode.
Figure 11:
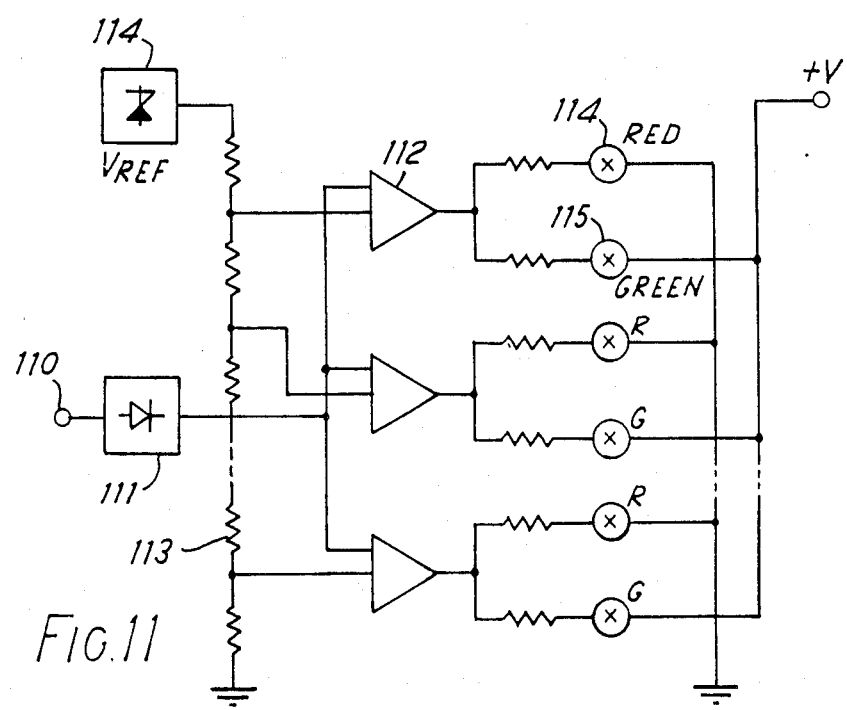
FIG. 11 represents an indicator circuit.

In a circuit for providing an indication of fluid level (FIG. 11) the output voltage from an electrode of the type described with reference to FIG. 10 is introduced at an input 110. The signal is rectified (assuming ac excitation is employed) by rectifier 111 and applied to a plurality of comparators, such as comparator 112, each of which is referred to a different reference voltage by virtue of separate connections to difference points in a divider chain 113 which divides a main reference voltage 114. It is arranged that the number of comparators is equal to the number of uninsulated portions on the rod electrode, and each respective reference voltage is arranged to be substantially that expected when fluid is at the level of each such portion. The comparators are arranged to drive either a red indicator (to indicate steam) such as indicator 114 or a green indicator (to indicate water) such an indicator 115 dependent upon the state of each comparator.

It will be appreciated that the non-linear output voltage characteristic is suitable for multi-comparison by virtue of the step changes with level, making false triggering of a comprator unlikely. A degree of compensation for erros such as the density error described above may be provided by varying the spacing and length of the insulated portions. The range of level indication may be a few hundred millimeters or several meters dependent upon the particular application. An advantage of employing an electrode of the segmented type for indication is that a standard circuit (FIG. 9) may be used over any range by selection of the length of the insulated portions in accordance with the level range required. For example the length of any particular segment may be proportioned to the level range of interest.

The matter which is claimed and for which the applicant seeks protection is:

1. A fluid level measurement system for measuring the level of a fluid in a vessel over a range of interest between two selected limiting points and above a minimum level of said fluid comprising:
    a first pair of electrodes for establishing a first conduction path through the fluid, each of the electrodes of said first pair being selectively insulated from fluid over a portion of each of said electrodes, with one of said electrodes being insulated from fluid over said range of interest such that said first path is completely below said minimum level, said first conduction path having a first impedance;
    a second pair of electrodes for establishing a second conduction path through the fluid, said second path varying with fluid level over said range of interest and having a second variable impedance;
    wherein said vessel is conductive and acts as one of said electrodes;
    energy supply means for establishing conduction through both said first and said second conduction paths;
    means for deriving an electrical output signal dependent upon the impedance ratio of said first path and said second path; and
    means for generating from said electrical output signal an output representative of fluid level.

2. The fluid level measurement system of claim 1 comprising first, second and third electrodes, said first and second electrodes establishing said first conduction path and said second and third electrodes establishing said second conduction path, and wherein said energy supply means is connected to said first and third electrodes and said electrical output signal is derived from said second electrode.

3. The fluid level measurement system of claim 2 wherein said second electrode has at least two electrically insulated segments, each extending over the range of interest, and separate means for deriving an electrical output signal connected to each segment, and wherein the means for delivering an output representative of fluid level comprises means for receiving said electrical signal outputs and means for delivering a validated fluid level output.

4. The fluid level measurement system of claim 1 wherein said first electrode pair is formed by a conductive rod having an insulated surface along its length over the range of interest and a surrounding conductive cylinder so that a first conduction path is established through fluid surrounding the rod tip.

5. The fluid level measurement system of claim 4 wherein the insulated surface is formed of insulated segments spaced apart lengthwise to provide conductive electrode portions at points over the range of interest, said portions being electrically common by virtue of continuity of the conductive rod.

6. The fluid level measurement system of claim 5 wherein the lengthwise spacing is unequal.

7. The fluid level measurement system of claim 5 wherein the length of the insulated segments is chosen in accordance with the level range required.

8. The fluid level measurement system of claim 1 wherein said first electrode pair is formed by a conductive cylinder having an insulated outer surface along its length over the range of interest and a surrounding electrode so that a first conductive path is established through fluid surrounding an uninsulated portion of the cylinder below the minimum level.

9. The fluid level measurement system of claim 8 wherein the insulated surface is formed of insulated segments spaced apart lengthwise to provide conductive electrode portions at points between said points limiting the range of interest, said portions being electrically connected together by means of the conductive rod.

10. The fluid level measurement system of claim 9 wherein the lengthwise spacing is unequal.

11. The fluid level measurement system of claim 9 wherein the length of the insulated segments is chosen in accordance with the level range required.

12. The fluid level measurement system of claim 1 wherein the means for delivering from said electrical output signal an output representative of fluid level comprises means for applying a co-efficient of proportion to said electrical output signal and for producing a further output signal which is proportional to said electrical output signal.

13. The fluid level measurement system of claim 1 wherein the means for delivering from said electrical output signal an output representative of fluid level comprises means for applying a non-linear transfer function to the output signal to produce a further output signal whose value changes in a non-linear fashion over the range of interest.

* * * * *